(12) United States Patent
Betker

(10) Patent No.: US 7,397,768 B1
(45) Date of Patent: Jul. 8, 2008

(54) ZONE MANAGEMENT IN A MULTI-MODULE FIBRE CHANNEL SWITCH

(75) Inventor: Steven Manning Betker, Shoreview, MN (US)

(73) Assignee: QLOGIC, Corporation, Aliso Viejo, CA (US)

( * ) Notice: Subject to any disclaimer, the term of this patent is extended or adjusted under 35 U.S.C. 154(b) by 911 days.

(21) Appl. No.: 10/241,153

(22) Filed: Sep. 11, 2002

(51) Int. Cl.
*H04L 12/28* (2006.01)
*H04L 12/56* (2006.01)

(52) U.S. Cl. ........................... 370/254; 370/422

(58) Field of Classification Search ......... 370/254–255, 370/522, 401, 422
See application file for complete search history.

(56) References Cited

U.S. PATENT DOCUMENTS

| | | | |
|---|---|---|---|
| 4,081,612 A | 3/1978 | Hafner | |
| 4,162,375 A | 7/1979 | Schilichte | 179/15 |
| 4,200,929 A | 4/1980 | Davidjuk et al. | |
| 4,382,159 A | 5/1983 | Bowditch | |
| 4,425,640 A | 1/1984 | Philip et al. | 370/58 |
| 4,546,468 A | 10/1985 | Christmas et al. | 370/54 |
| 4,569,043 A | 2/1986 | Simmons et al. | 370/63 |
| 4,725,835 A | 2/1988 | Schreiner et al. | 340/825.83 |
| 4,821,034 A | 4/1989 | Anderson et al. | 340/825 |
| 4,980,857 A | 12/1990 | Walter et al. | |
| 5,051,742 A | 9/1991 | Hullett et al. | |
| 5,090,011 A | 2/1992 | Fukuta et al. | |
| 5,115,430 A | 5/1992 | Hahne et al. | |
| 5,144,622 A | 9/1992 | Takiyasu et al. | 370/85.13 |
| 5,260,933 A | 11/1993 | Rouse | |
| 5,339,311 A | 8/1994 | Turner | |
| 5,367,520 A | 11/1994 | Cordell | 370/60 |
| 5,390,173 A | 2/1995 | Spinney et al. | |
| 5,568,165 A | 10/1996 | Kimura | |
| 5,590,125 A | 12/1996 | Acampora et al. | |
| 5,598,541 A | 1/1997 | Malladi | 395/286 |
| 5,610,745 A | 3/1997 | Bennett | 359/139 |
| 5,623,492 A | 4/1997 | Teraslinna | |
| 5,666,483 A | 9/1997 | McClary | |

(Continued)

FOREIGN PATENT DOCUMENTS

EP      0649098      9/1994

(Continued)

OTHER PUBLICATIONS

Brown, Douglas W., "A State-Machine Synthesizer", *18th Design Automation Conference*, (1981),301-305.

(Continued)

*Primary Examiner*—Kevin C Harper
(74) *Attorney, Agent, or Firm*—Klein, O'Neill & Singh, LLP; TJ Singh

(57) ABSTRACT

A method for changing zoning in a fiber channel fabric is provided. The method includes receiving zone date from a management module, wherein the zone data is received by a fiber channel switch; waiting for active Zone Set; and sending a merge request to neighboring switches. The method also includes, sending Zone Merge Data Start message to the management module; sending new zone data to management module; and comparing the new zone data with current zone data. The method also includes creating acceptance message for new zoning, wherein the management module creates the acceptance message.

21 Claims, 11 Drawing Sheets

U.S. PATENT DOCUMENTS

| | | | | |
|---|---|---|---|---|
| 5,687,172 | A | 11/1997 | Cloonan et al. | 370/395 |
| 5,701,416 | A | 12/1997 | Thorson et al. | |
| 5,706,279 | A | 1/1998 | Teraslinna | |
| 5,748,612 | A | 5/1998 | Stoevhase et al. | 370/230 |
| 5,790,840 | A | 8/1998 | Bulka et al. | |
| 5,812,525 | A | 9/1998 | Teraslinna | |
| 5,818,842 | A | 10/1998 | Burwell et al. | 370/397 |
| 5,821,875 | A | 10/1998 | Lee et al. | |
| 5,825,748 | A | 10/1998 | Barkey et al. | |
| 5,828,475 | A | 10/1998 | Bennett et al. | |
| 5,835,752 | A | 11/1998 | Chiang et al. | |
| 5,850,386 | A | 12/1998 | Anderson et al. | |
| 5,894,560 | A | 4/1999 | Carmichael et al. | |
| 5,954,796 | A | 9/1999 | McCarty et al. | |
| 5,978,359 | A | 11/1999 | Caldara et al. | |
| 5,978,379 | A | 11/1999 | Chan et al. | |
| 5,987,028 | A | 11/1999 | Yang et al. | 370/380 |
| 5,999,528 | A | 12/1999 | Chow et al. | 370/365 |
| 6,014,383 | A | 1/2000 | McCarty | 370/453 |
| 6,021,128 | A | 2/2000 | Hosoya et al. | 370/380 |
| 6,026,092 | A | 2/2000 | Abu-Amara et al. | |
| 6,031,842 | A | 2/2000 | Trevitt et al. | |
| 6,047,323 | A | 4/2000 | Krause | 709/227 |
| 6,055,618 | A | 4/2000 | Thorson | |
| 6,061,360 | A | 5/2000 | Miller et al. | |
| 6,081,512 | A | 6/2000 | Muller et al. | 370/256 |
| 6,108,738 | A | 8/2000 | Chambers et al. | |
| 6,108,778 | A | 8/2000 | LaBerge | |
| 6,118,776 | A | 9/2000 | Berman | |
| 6,128,292 | A | 10/2000 | Kim et al. | 370/356 |
| 6,144,668 | A | 11/2000 | Bass et al. | |
| 6,160,813 | A | 12/2000 | Banks et al. | 370/422 |
| 6,201,787 | B1 | 3/2001 | Baldwin et al. | |
| 6,229,822 | B1 | 5/2001 | Chow et al. | |
| 6,240,096 | B1 | 5/2001 | Book | |
| 6,252,891 | B1 | 6/2001 | Perches | |
| 6,253,267 | B1 | 6/2001 | Kim et al. | |
| 6,289,002 | B1 | 9/2001 | Henson et al. | |
| 6,308,220 | B1 | 10/2001 | Mathur | 709/238 |
| 6,324,181 | B1 | 11/2001 | Wong et al. | 370/403 |
| 6,330,236 | B1 | 12/2001 | Ofek et al. | 370/369 |
| 6,343,324 | B1 | 1/2002 | Hubis et al. | |
| 6,353,612 | B1 | 3/2002 | Zhu et al. | |
| 6,370,605 | B1 | 4/2002 | Chong | |
| 6,401,128 | B1 | 6/2002 | Stai et al. | |
| 6,411,599 | B1 | 6/2002 | Blanc et al. | 370/219 |
| 6,411,627 | B1 | 6/2002 | Hullett et al. | |
| 6,418,477 | B1 | 7/2002 | Verma | |
| 6,421,711 | B1 | 7/2002 | Blumenau et al. | |
| 6,424,658 | B1 | 7/2002 | Mathur | 370/429 |
| 6,449,274 | B1 | 9/2002 | Holden et al. | 370/392 |
| 6,452,915 | B1 | 9/2002 | Jorgensen | |
| 6,457,090 | B1 | 9/2002 | Young | |
| 6,467,008 | B1 | 10/2002 | Gentry et al. | |
| 6,470,026 | B1 | 10/2002 | Pearson et al. | |
| 6,532,212 | B1 | 3/2003 | Soloway et al. | |
| 6,570,850 | B1 | 5/2003 | Gutierrez et al. | |
| 6,570,853 | B1 | 5/2003 | Johnson et al. | |
| 6,594,231 | B1 | 7/2003 | Byham et al. | |
| 6,597,691 | B1 | 7/2003 | Anderson et al. | 370/360 |
| 6,597,777 | B1 | 7/2003 | Ho | |
| 6,614,796 | B1 | 9/2003 | Black et al. | |
| 6,657,962 | B1 | 12/2003 | Barri et al. | |
| 6,697,359 | B1 | 2/2004 | George | 370/357 |
| 6,697,368 | B2 | 2/2004 | Chang et al. | |
| 6,718,497 | B1 | 4/2004 | Whitby-Strevens | |
| 6,738,381 | B1 | 5/2004 | Agnevik et al. | |
| 6,744,772 | B1 | 6/2004 | Eneboe et al. | |
| 6,760,302 | B1 | 7/2004 | Ellinas et al. | |
| 6,785,241 | B1 | 8/2004 | Lu et al. | |
| 6,807,181 | B1 | 10/2004 | Weschler | |
| 6,816,492 | B1 | 11/2004 | Turner et al. | |
| 6,816,750 | B1 | 11/2004 | Klaas | |
| 6,859,435 | B1 | 2/2005 | Lee et al. | |
| 6,865,157 | B1 | 3/2005 | Scott et al. | |
| 6,886,141 | B1 | 4/2005 | Kunz et al. | |
| 6,941,357 | B2 * | 9/2005 | Nguyen et al. | 709/220 |
| 6,941,482 | B2 | 9/2005 | Strong | |
| 6,952,659 | B2 | 10/2005 | King et al. | |
| 6,968,463 | B2 | 11/2005 | Pherson et al. | |
| 7,000,025 | B1 | 2/2006 | Wilson | |
| 7,002,926 | B1 | 2/2006 | Eneboe et al. | |
| 7,010,607 | B1 | 3/2006 | Bunton | |
| 7,039,070 | B2 | 5/2006 | Kawakatsu | |
| 7,039,870 | B2 | 5/2006 | Takaoka et al. | |
| 7,047,326 | B1 | 5/2006 | Crosbie et al. | |
| 7,050,392 | B2 | 5/2006 | Valdevit | |
| 7,055,068 | B2 | 5/2006 | Riedl | |
| 7,061,862 | B2 | 6/2006 | Horiguchi et al. | |
| 7,061,871 | B2 | 6/2006 | Sheldon et al. | |
| 7,092,374 | B1 | 8/2006 | Gubbi | |
| 7,110,394 | B1 | 9/2006 | Chamdani et al. | |
| 7,123,306 | B1 | 10/2006 | Goto et al. | |
| 7,124,169 | B2 | 10/2006 | Shimozono et al. | |
| 7,151,778 | B2 | 12/2006 | Zhu et al. | |
| 7,171,050 | B2 | 1/2007 | Kim | |
| 7,185,062 | B2 | 2/2007 | Lolayekar et al. | |
| 7,188,364 | B2 * | 3/2007 | Volpano | 726/15 |
| 7,190,667 | B2 | 3/2007 | Susnow et al. | |
| 7,194,538 | B1 | 3/2007 | Rabe et al. | |
| 7,200,108 | B2 | 4/2007 | Beer et al. | |
| 7,215,680 | B2 | 5/2007 | Mullendore et al. | |
| 7,221,650 | B1 | 5/2007 | Cooper et al. | |
| 7,230,929 | B2 * | 6/2007 | Betker et al. | 370/254 |
| 7,245,613 | B1 | 7/2007 | Winkles et al. | |
| 7,248,580 | B2 | 7/2007 | George et al. | |
| 7,269,131 | B2 | 9/2007 | Cashman et al. | |
| 7,292,593 | B1 | 11/2007 | Winkles et al. | |
| 7,327,680 | B1 | 2/2008 | Kloth | |
| 2001/0011357 | A1 | 8/2001 | Mori | |
| 2001/0022823 | A1 | 9/2001 | Renaud | |
| 2001/0038628 | A1 | 11/2001 | Ofek et al. | 370/392 |
| 2002/0016838 | A1 | 2/2002 | Geluc et al. | |
| 2002/0034178 | A1 | 3/2002 | Schmidt et al. | |
| 2002/0071387 | A1 | 6/2002 | Horiguchi et al. | |
| 2002/0103913 | A1 | 8/2002 | Tawil et al. | |
| 2002/0104039 | A1 | 8/2002 | DeRolf et al. | |
| 2002/0124124 | A1 | 9/2002 | Matsumoto et al. | |
| 2002/0147560 | A1 | 10/2002 | Devins et al. | |
| 2002/0147843 | A1 | 10/2002 | Rao | |
| 2002/0156918 | A1 | 10/2002 | Valdevit et al. | |
| 2002/0159385 | A1 | 10/2002 | Susnow et al. | |
| 2002/0172195 | A1 | 11/2002 | Pekkala et al. | |
| 2002/0191602 | A1 | 12/2002 | Woodring et al. | |
| 2002/0196773 | A1 | 12/2002 | Berman | |
| 2003/0016683 | A1 | 1/2003 | George et al. | |
| 2003/0021239 | A1 | 1/2003 | Mullendore et al. | |
| 2003/0026267 | A1 | 2/2003 | Oberman et al. | |
| 2003/0026287 | A1 | 2/2003 | Mullendore et al. | |
| 2003/0035433 | A1 | 2/2003 | Craddock et al. | |
| 2003/0046396 | A1 | 3/2003 | Richter et al. | |
| 2003/0056000 | A1 | 3/2003 | Mullendore et al. | |
| 2003/0072316 | A1 | 4/2003 | Niu et al. | |
| 2003/0076788 | A1 * | 4/2003 | Grabauskas et al. | 370/254 |
| 2003/0079019 | A1 | 4/2003 | Lolayekar et al. | |
| 2003/0084219 | A1 | 5/2003 | Yao et al. | |
| 2003/0086377 | A1 | 5/2003 | Berman | |
| 2003/0091062 | A1 | 5/2003 | Lay et al. | |
| 2003/0103451 | A1 | 6/2003 | Lutgen et al. | |
| 2003/0117961 | A1 | 6/2003 | Chuah et al. | |
| 2003/0120983 | A1 | 7/2003 | Vieregge et al. | |
| 2003/0126223 | A1 | 7/2003 | Jenne et al. | |
| 2003/0137941 | A1 * | 7/2003 | Kaushik et al. | 370/241 |
| 2003/0174652 | A1 | 9/2003 | Ebata | |

| | | |
|---|---|---|
| 2003/0174721 A1 | 9/2003 | Black et al. |
| 2003/0174789 A1 | 9/2003 | Waschura et al. |
| 2003/0179709 A1 | 9/2003 | Huff |
| 2003/0179748 A1 | 9/2003 | George et al. ............... 370/389 |
| 2003/0189930 A1 | 10/2003 | Terrell et al. |
| 2003/0189935 A1 | 10/2003 | Warden et al. |
| 2003/0191857 A1 | 10/2003 | Terell et al. |
| 2003/0195983 A1 | 10/2003 | Krause |
| 2003/0218986 A1 | 11/2003 | DeSanti et al. |
| 2003/0229808 A1 | 12/2003 | Heintz et al. |
| 2003/0236953 A1 | 12/2003 | Grieff et al. |
| 2004/0013092 A1 | 1/2004 | Betker et al. |
| 2004/0013125 A1 | 1/2004 | Betker et al. |
| 2004/0015638 A1 | 1/2004 | Bryn |
| 2004/0024831 A1 | 2/2004 | Yang et al. |
| 2004/0028038 A1 | 2/2004 | Anderson et al. |
| 2004/0057389 A1 | 3/2004 | Klotz et al. |
| 2004/0081186 A1 | 4/2004 | Warren et al. |
| 2004/0081394 A1 | 4/2004 | Biren et al. |
| 2004/0085955 A1 | 5/2004 | Walter et al. |
| 2004/0085994 A1 | 5/2004 | Warren et al. |
| 2004/0100944 A1 | 5/2004 | Richmond et al. |
| 2004/0109418 A1 | 6/2004 | Fedorkow et al. |
| 2004/0123181 A1 | 6/2004 | Moon et al. |
| 2004/0141521 A1 | 7/2004 | George ...................... 370/463 |
| 2004/0151188 A1 | 8/2004 | Maveli et al. |
| 2004/0153914 A1 | 8/2004 | El-Batal |
| 2004/0174813 A1 | 9/2004 | Kasper et al. |
| 2004/0208201 A1 | 10/2004 | Otake |
| 2004/0267982 A1 | 12/2004 | Jackson et al. |
| 2005/0023656 A1 | 2/2005 | Leedy |
| 2005/0036499 A1* | 2/2005 | Dutt et al. .................. 370/401 |
| 2005/0036763 A1 | 2/2005 | Kato et al. |
| 2005/0073956 A1 | 4/2005 | Moores et al. |
| 2005/0076113 A1 | 4/2005 | Klotz et al. |
| 2005/0088969 A1 | 4/2005 | Carlsen et al. |
| 2005/0117522 A1 | 6/2005 | Basavaiah et al. |
| 2005/0177641 A1 | 8/2005 | Yamagami |
| 2005/0198523 A1 | 9/2005 | Shanbhag et al. |
| 2006/0013248 A1* | 1/2006 | Mujeeb et al. .............. 370/463 |
| 2006/0034192 A1 | 2/2006 | Hurley et al. |
| 2006/0047852 A1 | 3/2006 | Shah et al. |
| 2006/0074927 A1 | 4/2006 | Sullivan et al. |
| 2006/0107260 A1 | 5/2006 | Motta |
| 2006/0184711 A1 | 8/2006 | Pettey |
| 2006/0203725 A1 | 9/2006 | Paul et al. |
| 2007/0206502 A1 | 9/2007 | Martin et al. |

FOREIGN PATENT DOCUMENTS

| | | |
|---|---|---|
| EP | 0856969 | 1/1998 |
| WO | WO-98/36537 | 8/1998 |
| WO | WO03/088050 | 10/2003 |

OTHER PUBLICATIONS

International Preliminary Report on Patentability dated Apr. 3, 2007, for International patent application No. PCT/US2005/034844.
International Preliminary Report on Patentability dated Apr. 3, 2007, for International patent application No. PCT/US2005/034758.
International Preliminary Report on Patentability dated Apr. 11, 2007, for International patent application No. PCT/US2005/034845.
International Preliminary Report on Patentability dated Apr. 3, 2007, for International patent application No. PCT/US2005/035064.
International Preliminary Report on Patentability dated Jul. 24, 2007, for International patent application No. PCT/US2005/42528.
"Examination Report from the European Patent Office dated Oct. 12, 2007 for European Application No. 05 805 632.6".
International Preliminary Report on Patentability dated Apr. 3, 2007, for International patent application No. PCT/US2005/034844.
International Preliminary Report on Patentability dated Apr. 3, 2007, for International patent application No. PCT/US2005/034758.
International Preliminary Report on Patentability dated Apr. 11, 2007, for International patent application No. PCT/US2005/034845.
International Preliminary Report on Patentability dated Apr. 3, 2007, for International patent application No. PCT/US2005/035064.
International Preliminary Report on Patentability dated Jul. 24, 2007, for International patent application No. PCT/US2005/42528.
Banks, David C., et al., "Link Trunking and Measuring Link Latency in Fibre Channel Fabric", U.S. Appl. No. 60/286,046, 1-52, Apr. 23, 2001.
Curtis, A. R., "Design Considerations for 10-Gbit Fibre Channel", *Curtis A. Ridgeway, Distinguished I/O Architect, Storage and Computing ASIC's Division, LSI Logic Corp*.
Malavalli, Kumar, "High Speed Fibre Channel Switching Fabric Devices", *Proceedings of the SPIE, SPIE*, Bellingham, VA, USA vol. 1577., XP000562869, ISSN: 0277-786X,(Sep. 4, 1991),216-226.
Melhem, et al., "Minimizing Wavelength Conversions in WDM Path Establishment", *Computer Science Department, University of Pittsburgh*, Pittsburgh, PA 15260, (2001), 197-211.
Ridgeway, Curt , "0GFC-40GFC using 4-lane XAUI's", *LSI Logic Presentation*—T11/03-069v0.
Clark, Tom, "Zoning for Fibre Channel Fabrics", Vixel Corporation Paper—XP002185194., (Aug. 1999), pp. 1-6.
Malavalli, Kumar, et al., "Distributed Computing with fibre channel fabric", Proc of the Computer Soc. Int'l Conf., Los Alamitos, IEEE Comp Soc. Press., vol. Conf. 37, XP000340745, (Feb. 24, 1992), pp. 269-274.
Martin, Charles R., "Fabric Interconnection of fibre channel standard nodes", Proceedings of the SPIE., (Sep. 8, 1992), pp. 65-71.
Yoshida, Hu, "LUN Security Considerations for Storage Area Networks," Hitachi Data Systems Paper—XP 002185193 (1999), pp. 1-7.
Claudio DeSanti, "Virtual Fabrics Switch Support"; VF Switch Support, T11/04-395v2. Sep. 2004, pp. 1-15.
Pelissier et al, "Inter-Fabric Routing", dated Jul. 30, 2004, Inter Fabric Routing (04-520v0); pp. 1-31.
DeSanti et al, "Virtual Fabrics"; Virtual Fabrics, T11/03-352v0, May 2003; pp. 1-4.
Martin et al , "Virtual Channel Architecture", Presentation by Brocade to T11/03-369V0 dated Jun. 2, 2003.
Fibre Channel Switch Fabric—2 (FC-SW-2) Rev 5.4, NCITS working draft proposed American National Standard for Information Technology, Jun. 26, 2001., T11/Project 1305 -D/Rev 5.4.
Fibre Channel Generic Services—3 (FC-GS-3) Rev 7.01 NCITS working draft proposed American National Standard for Information Technology, Nov. 28, 2000., T11/Project 1356 D/Rev 7.01.
"Office Action from USPTO dated Oct. 4, 2007 for U.S. Appl. No. 10/894,627".
"Office Action from USPTO dated Oct. 25, 2007 for U.S. Appl. No. 10/894,491".
Malavalli, et al., "Fibre Channel Framing and Signaling (FC-FS) REV 1.10", *NCITS working draft proposed American National Standard for Information Technology,* (Jan. 25, 2001).
"Office Action from USPTO dated Jan. 19, 2006 for U.S. Appl. No. 10/212,425".
"Office Action from USPTO dated Dec. 5, 2006 for U.S. Appl. No. 10/212,425".
"Office Action from USPTO dated May 21, 2007 for U.S. Appl. No. 10/212,425".
"Office Action from USPTO dated Nov. 15, 2006 for U.S. Appl. No. 10/263,858".
"Office Action from USPTO dated Jul. 11, 2007 for U.S. Appl. No. 10/263,858".
"Office Action from USPTO dated Jan. 19, 2007 for U.S. Appl. No. 10/302,149".
"Office Action from USPTO dated Aug. 20, 2007 for U.S. Appl. No. 10/302,149".
"Office Action from USPTO dated Jul. 3, 2007 for U.S. Appl. No. 10/664,548".
"Office Action from USPTO dated Sep. 20, 2007 for U.S. Appl. No. 10/798,527".
"Office Action from USPTO dated Sep. 20, 2007 for U.S. Appl. No. 10/889,267".
"Office Action from USPTO dated Aug. 31, 2007 for U.S. Appl. No. 10/889,635".

"Office Action from USPTO dated Mar. 21, 2006 for U.S. Appl. No. 10/889,588".
"Office Action from USPTO dated Sep. 10, 2007 for U.S. Appl. No. 10/889,255".
"Office Action from USPTO dated Sep. 4, 2007 for U.S. Appl. No. 10/889,551".
"Office Action from USPTO dated Sep. 20, 2007 for U.S. Appl. No. 10/889,259".
"Office Action from USPTO dated Sep. 19, 2007 for U.S. Appl. No. 10/894,492".
"Office Action from USPTO dated Oct. 23, 2007 for U.S. Appl. No. 10/894,597".
"Office Action from USPTO dated Oct. 25, 2007 for U.S. Appl. No. 10/894,579".
"Office Action from USPTO dated Oct. 11, 2007 for U.S. Appl. No. 10/894,629".
"Office Action from USPTO dated Oct. 25, 2007 for U.S. Appl. No. 10/894,536".
"Office Action from USPTO dated Nov. 13, 2007 for U.S. Appl. No. 10/894,586".
"Office Action from USPTO dated Oct. 17, 2007 for U.S. Appl. No. 10/894,917".
"Office Action from USPTO dated Jun. 28, 2007 for U.S. Appl. No. 10/894,529".
"Office Action from USPTO dated Sep. 14, 2007 for U.S. Appl. No. 10/894,978".
"Office Action from USPTO dated Apr. 6, 2007 for U.S. Appl. No. 10/956,718".
"Office Action from USPTO dated Oct. 3, 2007 for U.S. Appl. No. 10/956,717".
"Office Action from USPTO dated Jun. 1, 2007 for U.S. Appl. No. 10/961,463".
"Office Action from USPTO dated Sep. 6, 2007 for U.S. Appl. No. 10/889,337".
"Office Action from USPTO dated Dec. 7, 2007 for U.S. Appl. No. 10/961,463".
"Notice of Allowance from USPTO dated Dec. 21, 2007 for U.S. Appl. No. 10/961,463".
"Notice of Allowance from USPTO dated Dec. 20, 2007 for U.S. Appl. No. 10/889,337".
"Notice of Allowance from USPTO dated Jan. 8, 2008 for U.S. Appl. No. 10/889,551".
"Office Action from USPTO dated Jan. 9, 2008 for U.S. Appl. No. 10/798,468".
"Office Action from USPTO dated Jan. 9, 2008 for U.S. Appl. No. 11/608,634".
"Notice of Allowance from USPTO dated Jan. 11, 2008 for U.S. Appl. No. 10/664,548".
"Notice of Allowance from USPTO dated Jan. 10, 2008 for U.S. Appl. No. 10/263,858".
"Notice of Allowance from USPTO dated Feb. 8, 2008 for U.S. Appl. No. 10/894,529".
"Office Action from USPTO dated Feb. 12, 2008 for U.S. Appl. No. 11/057,912".
"Office Action from USPTO dated Mar. 5, 2008 for U.S. Appl. No. 10/889,259".
"Office Action from USPTO dated Mar. 7, 2008 for U.S. Appl. No. 10/894,629".
"Office Action from USPTO dated Mar. 20, 2008 for U.S. Appl. No. 10/894,732".

* cited by examiner

ZONE MANAGEMENT IN A MULTI-MODULE FIBRE CHANNEL SWITCH

BACKGROUND

1. Field of the Invention

The present invention relates to fibre channel systems, and more particularly to zone management in fibre channel fabrics.

2. Background of the Invention

Fibre channel is a set of American National Standard Institute (ANSI) standards which provide a serial transmission protocol for storage and network protocols such as HIPPI, SCSI, IP, ATM and others. Fibre channel provides an input/output interface to meet the requirements of both channel and network users.

Fibre channel supports three different topologies: point-to-point, arbitrated loop and fibre channel fabric. The point-to-point topology attaches two devices directly. The arbitrated loop topology attaches devices in a loop. The fibre channel fabric topology attaches host systems directly to a fabric, which are then connected to multiple devices. The fibre channel fabric topology allows several media types to be interconnected.

Fibre channel is a closed system that relies on multiple ports to exchange information on attributes and characteristics to determine if the ports can operate together. If the ports can work together, they define the criteria under which they communicate.

In fibre channel, a path is established between two nodes where the path's primary task is to transport data from one point to another at high speed with low latency, performing only simple error detection in hardware. The fibre channel switch provides circuit/packet switched topology by establishing multiple simultaneous point-to-point connections.

Fibre channel fabric devices include a node port or "N_Port" that manages fabric connections. The N_port establishes a connection to a fabric element (e.g., a switch) having a fabric port or F_port. Fabric elements include the intelligence to handle routing, error detection, recovery, and similar management functions.

A fibre channel switch is a multi-port device where each port manages a simple point-to-point connection between itself and its attached system. Each port can be attached to a server, peripheral, I/O subsystem, bridge, hub, router, or even another switch. A switch receives a message from one port and automatically routes it to another port. Multiple calls or data transfers happen concurrently through the multi-port fibre channel switch.

Fibre channel switches may use multiple modules (also referred to as "blades") connected by fibre channel ports. Conventionally, a multi-module switch is integrated as a single switch and appears to other devices in the fibre channel fabric as a single switch.

Fibre channel standard FC-GS-3, published Nov. 28$^{th}$, 2000, incorporated herein by reference in its entirety, describes fabric zones using fibre channel address identifiers. Typically, a network administrator (or a management module) creates a zone. Zoning is used to limit visibility of certain devices in the fabric so that subsets of end-user devices can communicate with each other. Section 8 of the FC-GS-3 standard describes how zones are created.

Conventional zone management techniques as provided by current fibre channel standards (FC-SW-2 and FC-GS-3) do not provide any solution or guidance for zone management in a multi-module switch. Multi-module switches are being extensively used today without efficient zone management.

Therefore, what is required is a process and system for zone management in multi-module fibre channel switches.

SUMMARY OF THE INVENTION

In one aspect of the present invention, a method is provided for loading zoning data to a multi-module switch from a management module, either for initial startup or after zone merge request from a neighboring switch. The method includes, sending Zone Merge Data Start message from the management module to switch modules; and sending new zone data to the switch modules. The switch modules initiate zone merge request with any neighboring switches after receiving the zone data.

In another aspect of the present invention, a method for a multi-module switch to handle zone merge request from a neighboring switch is provided. The method includes sending received zone data from a switch module to the management module; comparing received zone data with current zone data, and creating a reply to send to the neighboring switch. This may result in isolation of the link with the neighboring switch because of incompatible zoning (as described in FC-SW-2), a change in zoning data or no change in zoning data. If zoning data is changed, the management module loads the new zone data to the switch modules as described above.

In yet another aspect of the present invention, a method for changing zoning by a management module in a fibre channel fabric is provided. The method includes receiving management commands, wherein the management module receives the commands and selects a switch module for the process; sending an ACA message to the switch module; and determining if the Fabric is locked by checking replies to the ACA message. If the ACA is successful, the management module downloads the new zone data and the selected switch module sends it to the other switch modules and to external switches using the SFC, UFC, RCA protocol described in FC-SW-2.

In yet another aspect of the present invention, a method for handling zone changes originated from external switches is provided. When an ACA is received from another switch, the switch module forwards it to the management module and the other switch modules. If the replies to these are all successful, the switch module sends an affirmative reply to the original external switch. The switch module then processes the SFC, UFC, RCA messages (defined below in FC-SW-2) and forwards the data to the management module and the other switch modules.

In one aspect of the present invention, the management module provides a central point of control to synchronize all the switch modules in the multi-module switch. This prevents different switch modules from trying to make separate zone changes at the same time. This allows multiple switch modules to appear as one switch to external switches while keeping zone management operations consistent.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures.

DETAILED DESCRIPTION OF THE PREFERRED EMBODIMENTS

Definitions

Following definitions are provided as they are typically (but not exclusively) used in the fibre channel environment, implementing the various adaptive aspects of the present invention.

"ACA": Accept Change Authorization message defined by FC-SW-2 in section 10.6.1 provides a mechanism to lock a fabric to distribute zoning data among switches (not modules, as described below in the present invention).

"Blade": A module in a fibre channel switch.

"Blade_Id": A unique identifier for identifying a switch module.

"EBP": Exchange Blade Parameters, created by Multi-Blade Protocol

"Fibre channel ANSI Standard": The standard describes the physical interface, transmission and signaling protocol of a high performance serial link for support of other high level protocols associated with IPI, SCSI, IP, ATM and others.

"FC-1": Fibre channel transmission protocol, which includes serial encoding, decoding and error control.

"FC-2": Fibre channel signaling protocol that includes frame structure and byte sequences.

"FC-3": Defines a set of fibre channel services that are common across plural ports of a node.

"FC-4": Provides mapping between lower levels of fibre channel, IPI and SCSI command sets, HIPPI data framing, IP and other upper level protocols.

"Fabric": A system which interconnects various ports attached to it and is capable of routing fibre channel frames by using destination identifiers provided in FC-2 frame headers.

"Fabric Topology": This is a topology where a device is directly attached to a fibre channel fabric that uses destination identifiers embedded in frame headers to route frames through a fibre channel fabric to a desired destination.

"MR": Merge Request as defined by FC-SW-2 in Section 10.4.3 requests the recipient to merge any active zoning data with the zoning data supplied in the MR payload.

"Multi Blade protocol": A protocol that operates on internal switch module ports to assign a primary blade.

"Port": A general reference to N. Sub.--Port or F.Sub.--Port.

"RCA": Request change authorization, as defined by FC-SW-2 in section 10.6.2, request release of Local Change Authorization is each switch.

"SFC": Stage Fabric Configuration as defined by FC-SW-2 in section 10.6.3, includes, request messages to stage Zoning Configuration change in a switch.

"UFC": Update Fabric Configuration request messages as defined by FC-SW-2 in Section 10.6.4, update Zoning configuration in a switch.

The Fibre Channel Specification used to build one embodiment of the present invention includes:

FC-SW-2 standard; and

FC-GS-3, as published by the American National Standard Institute, both incorporated herein by reference in their entirety.

To facilitate an understanding of the preferred embodiment, the general architecture and operation of a fibre channel system will be described. The specific architecture and operation of the preferred embodiment will then be described with reference to the general architecture of the fibre channel system.

Figure 1:
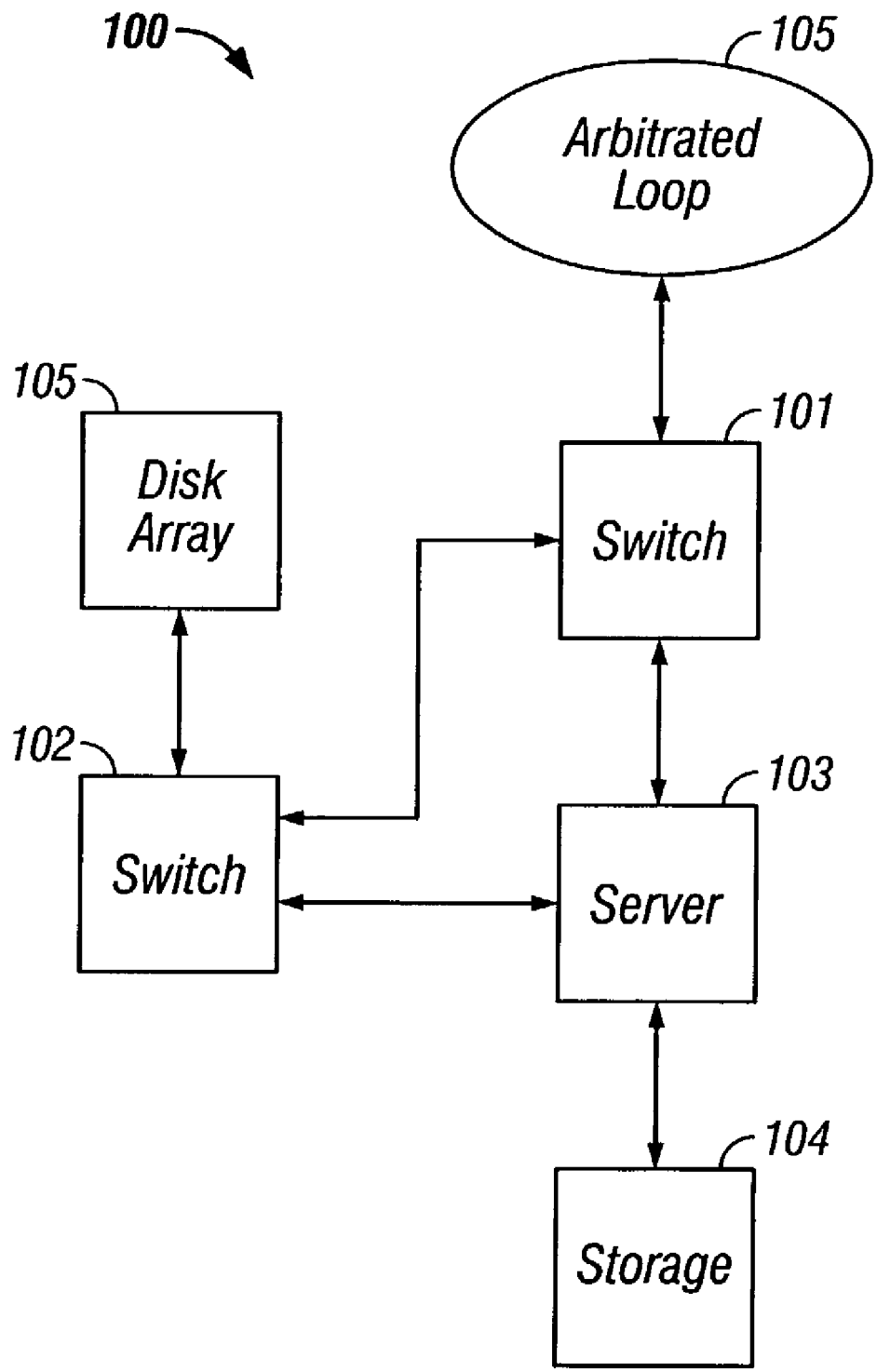
FIG. 1, as described above, shows a block diagram of a fibre channel system using a fibre channel fabric.

FIG. 1 is a block diagram of a fibre channel system 100 implementing the methods and systems in accordance with the adaptive aspects of the present invention. System 100 includes plural devices that are interconnected. Each device includes one or more ports, classified as node ports (N_Ports), fabric ports (F_Ports), and expansion ports (E_Ports). Node ports may be located in a node device, e.g. server 103, disk array 105 and storage device 104. Fabric ports are located in fabric devices such as switch 101 and 102. Arbitrated loop 105 may be operationally coupled to switch 101 using arbitrated loop ports (FL;Ports).

The devices of FIG. 1 are operationally coupled via "links" or "paths". A path may be established between two N_ports, e.g. between server 103 and storage 104. A packet-switched path may be established using multiple links, e.g. an N-Port in server 103 may establish a path with disk array 105 through switch 102.

Switch 101 includes an E_Port that enables a path to another switch 102. An inter-switch link ("ISL") enables N_Ports to operationally couple to other N-Ports in a fabric.

Figure 2A:
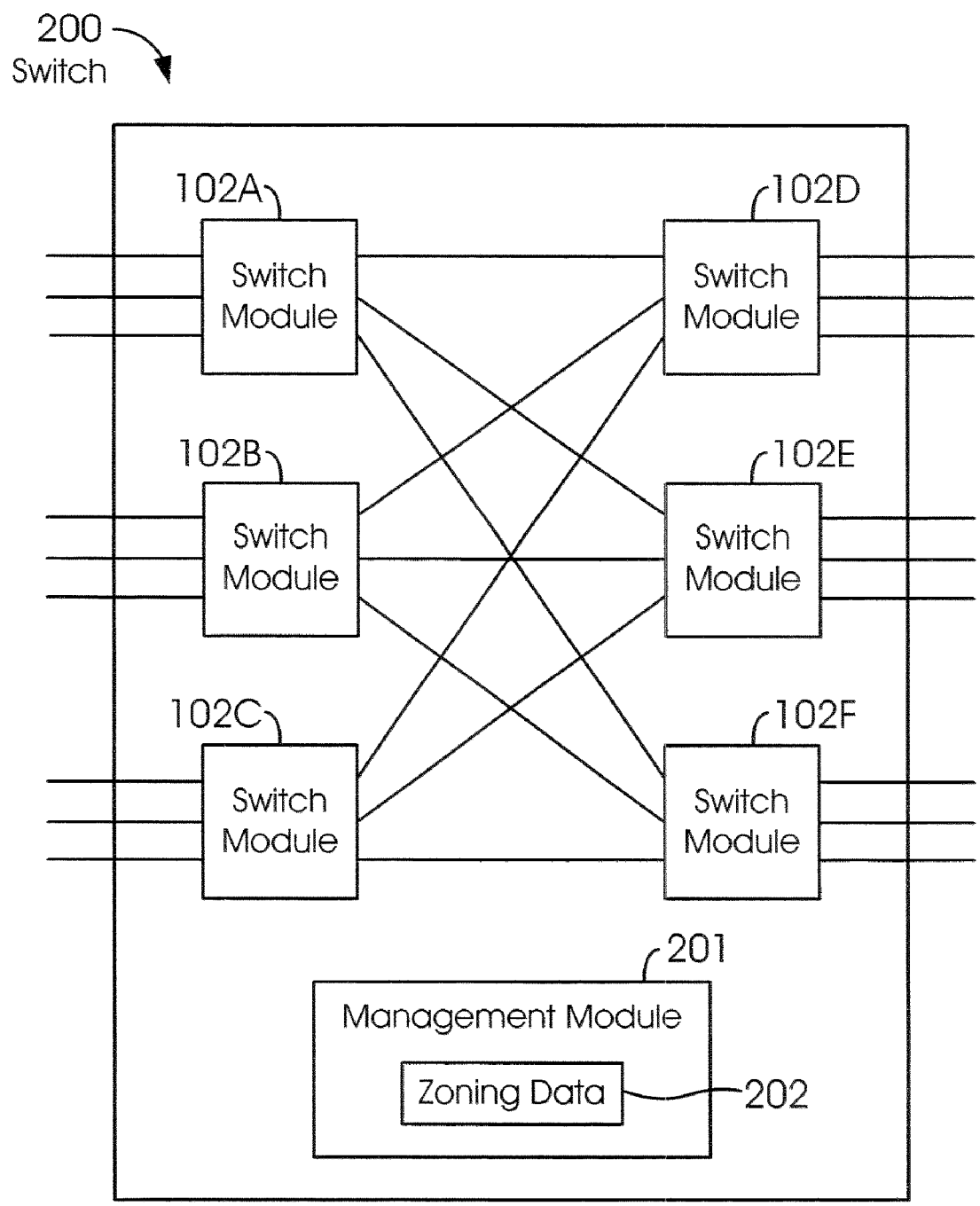
FIG. 2A is a block diagram showing a multi-module switch.

FIG. 2A is a block diagram that shows plural switch modules (or blades) 102A-102F (or 103) integrated into a single multi-module switch 200. Internal ports between the switch modules operate on a multi-blade protocol, while external ports operate under FC-SW-2 protocol. One of the switch modules out of 102A-102F operates as a primary blade so that to other devices in fibre channel system 100, switch module 200 appears as a single switch.

Also shown in FIG. 2A is management module 201 that is operationally coupled to switch 200 via an external network connection (e.g. Ethernet (not shown). Management module 201 includes zoning data 202 stored within management module 201 memory (not shown) or any memory storage device external to management module 201. Management module 201 manages switch module 200 and other switches in a fabric.

Management module 201 is connected to all the switch modules 102A-102F in switch 200. Management module 201 provides an interface so that a switch 200 user can configure the switch.

Figure 2B:
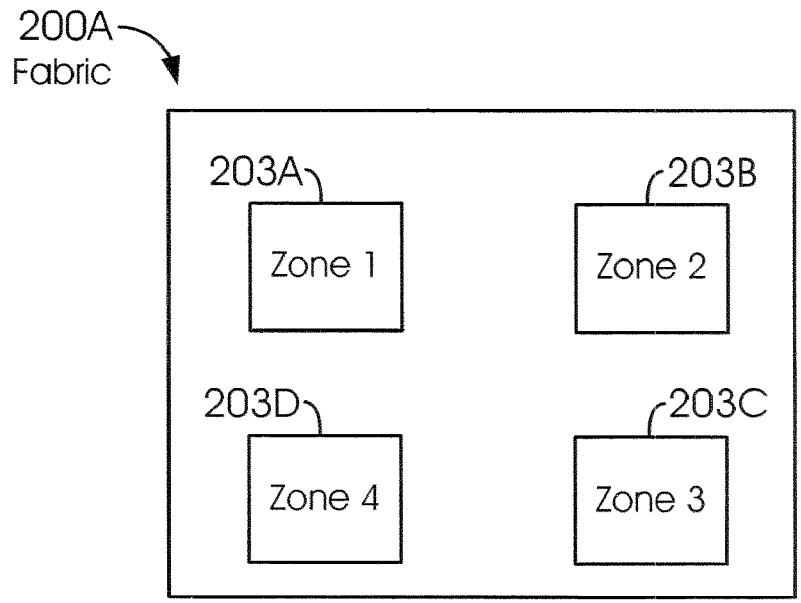
FIG. 2B is a block diagram showing plural zones in a fibre channel fabric.

FIG. 2B is a block diagram of a fabric 200A that shows plural zones 203A-203D to limit visibility of certain devices in the fabric so that subsets of end-user devices can communicate with each other.

Changes to zoning if any, as described below, may be initiated either by a switch module (e.g. 102A) or management module 201.

Figure 3:
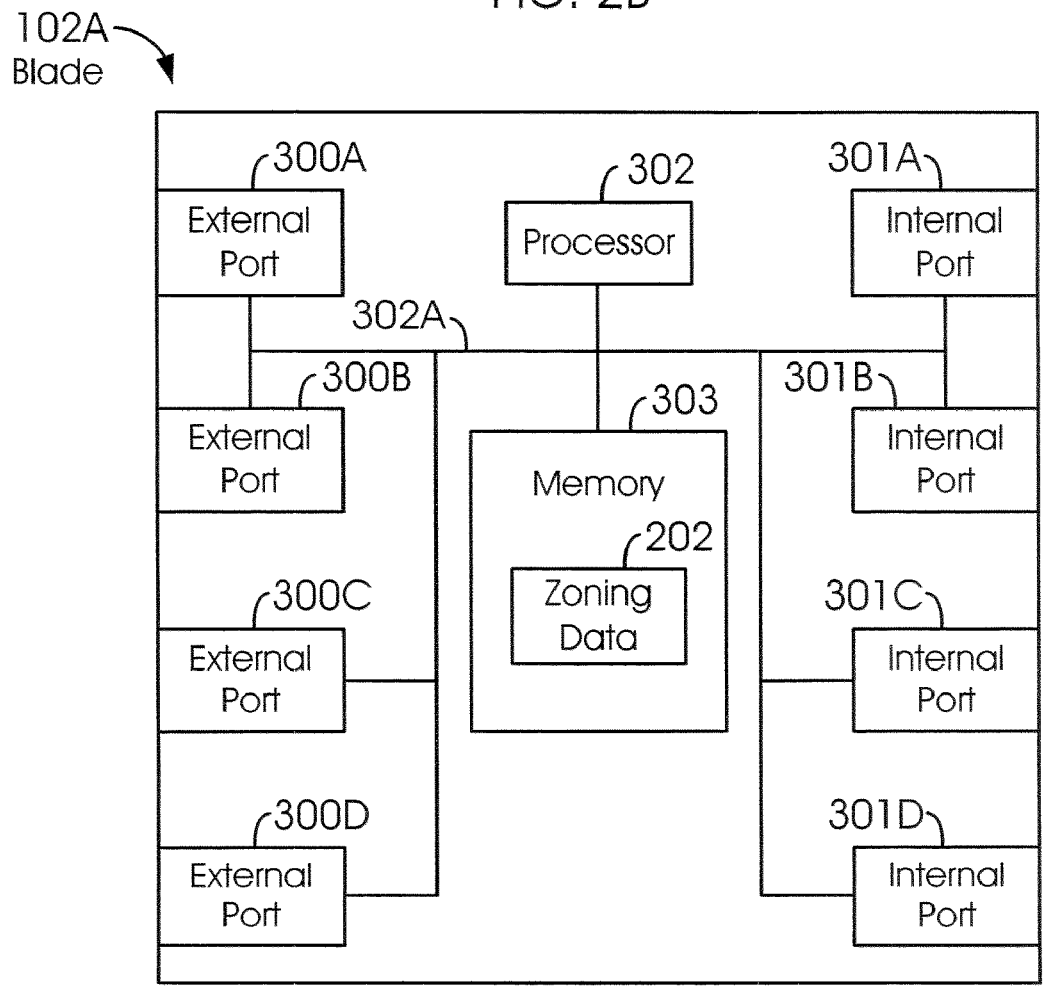
FIG. 3 is block diagram of a switch module in a multi-module switch environment, according to one aspect of the present invention.

FIG. 3 is a block diagram of a blade in a multi-module switch, e.g. blade 102A, that implements the adaptive aspects of the present invention. Switch module 102A includes plural external ports (F_Ports operationally coupled to other devices, e.g. server 103; or E_Ports coupled to other switch modules) 300A through 300D; and internal ports 301A-301D that operates under a multi-blade protocol.

Blade 102A also includes processor 302 to execute the process steps described below. Processor 302 may be a Pentium™ class processor marketed by Intel Corp.™; or any other processor. Processor 302 is operationally coupled to a bus 302A and to memory 303. It is noteworthy that zoning data 202 may also be stored in memory 303.

Zoning in a fibre channel fabric may change due to the following events:

(a) At System startup—Management module 201 may transmit any saved zoning data to switch modules 102A-102F, upon system 200 start-up. Switch modules 102A-102F then initiate a Merge Request ("MR") message to neighboring modules on external E-port connections (see FC-SW-2).

(b) By Zone MR: Neighboring switches may send MR messages to an E-port on a switch module. If the zones change, management module 201 and other switch modules are updated. If the zone merge request fails because the zones are incompatible (per zone merge rules in FC-SW-2) or insufficient resources are available for the received zone set, the E-port that received the MR message is isolated.

(c) By Management commands to management module 201: New zoning data is sent to switch modules 102A-102F, and to other switches in Fabric 200A. Management module 201 allows a user to define zone data. When management module 201 changes zone data in Fabric 200A, it selects a switch module (e.g. 102A) to change zone data. Management module 201 sends an ACA message to the selected switch module (102A). Switch module 102A then sends the ACA to all the other switch modules (102B-102F) and to all external switches. If all switch modules (102B-102F) and external switches accept the ACA message, then switch module 102A sends an accept reply to management module 201. Management module 201 then sends the "Change Zone Data Start" message to indicate the start of the zone data, followed by the new zone data. Switch module 102A then executes SFC, UFC, and RCA protocol based messages as described by FC-SW-2 to send zoning data to other switch modules and to external switches.

(d) By Fabric Zone Server Commands: Fabric Zone Server commands (per FC-GS-3) are received on Fibre Channel ports from N-ports attached to a switch. Commands that might change zoning data are sent to management module 201. If needed, management module 201 updates Fabric 200A zoning using the same method used for management commands described in section (c) above.

(e) Zone Change request from another switch: Management commands from another switch may use the zone change protocol described in FC-SW-2 to update Management module 201 and other switch modules.

Management module 201 and switch modules 102A-102F use the following commands to execute the process steps described below:

"Activate":

This command indicates that current zone data became the active zone data set.

"Zone Merge Data Start":

This command indicates that zone merge data from another switch, or zone data stored with management module 201, will be transferred.

"Zone Change Data Start":

This command indicates that zone change data from another switch, or changed zone data from management module 201, is being transferred.

"Zone Data":

This command allows transfer of zoning data 202 to/or from management module 201.

"ACA, SFC, UFC, RCA":

These are messages derived from zoning management messages described in FC-SW-2 and used by a switch for changing zoning in an operating Fabric.

Figure 4A:
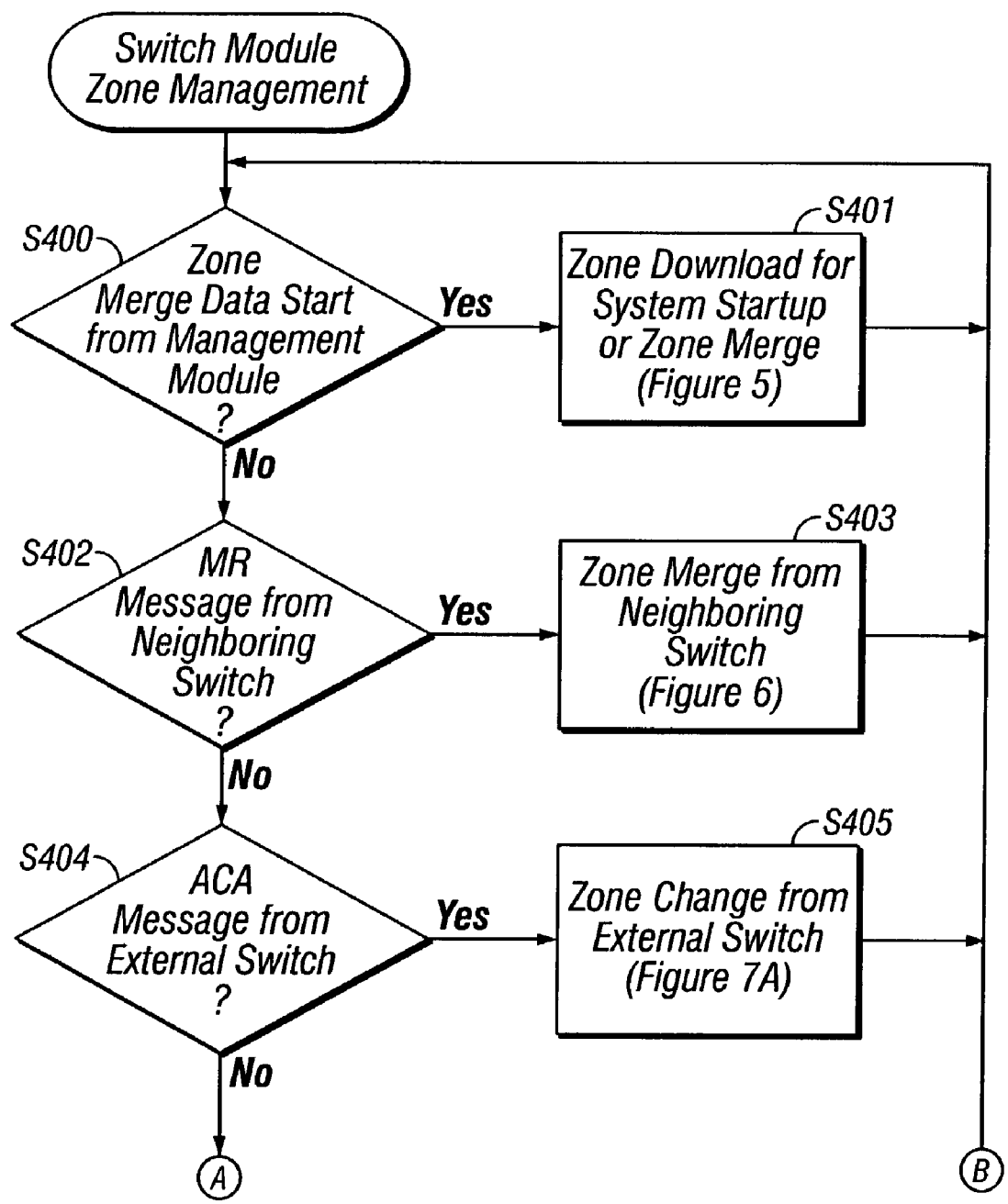
FIGS. 4A and 4B is a flow diagram of the overall process steps to implement zoning, according to one aspect of the present invention.
Figure 4B:
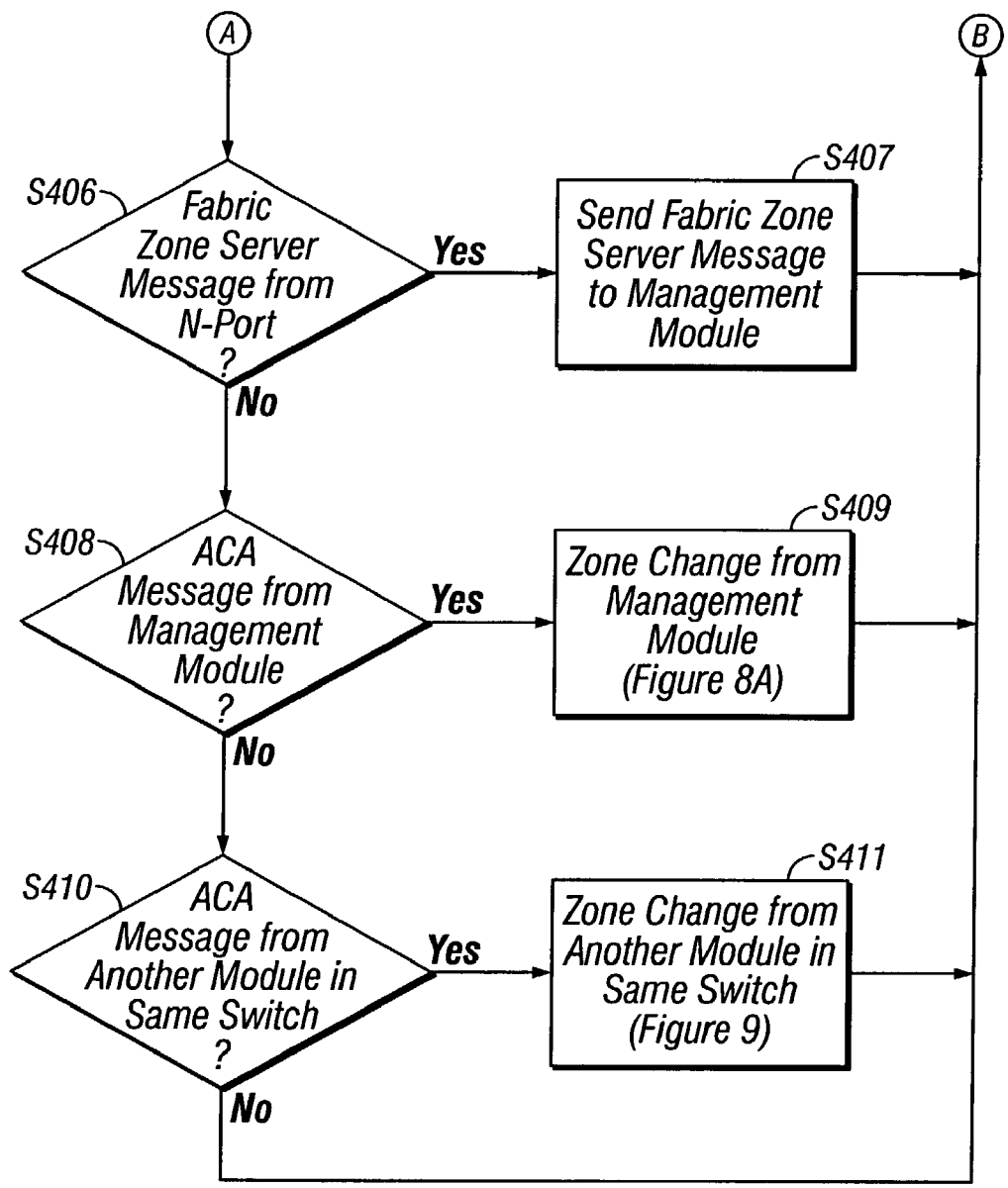

FIGS. 4A and 4B shows a flow diagram of the overall process steps for zone management in a fibre channel switch.

Turning in detail to FIGS. 4A and 4B, in step S400, the process determines if zone merge data is received from management module 201. If zone merge data is received from management module 201, the process moves to step S401, described below with respect to FIG. 5.

If zone merge data has not been received from management module 201, then in step S402, the process determines if a MR message has been received from a neighboring switch. If a MR message has been received, then the process moves to step 403, described below with respect to FIG. 6.

If an MR message is not received in step S402, then the process moves to step S404, where it determines if an ACA message has been received from an external switch. If an ACA message has been received, then zone change occurs in step S405, described below with respect to FIGS. 7A and 7B.

If an ACA message is not received in step S404, the process moves to step S406. In step S406, the process determines if a fabric zone server message has been received from a N-port. If the fabric zone server message has been received, then in step S407, the fabric zone server message is sent to management module 201 and management module 201 initiates zone changes, as described below.

If fabric zone server message is not received in step S406, then in step S408, the process determines if an ACA message has been received from management module 201.

If an ACA message is received, then in step S409, zone change occurs, as described below with respect to FIGS. 8A and 8B.

If an ACA message is not received in step S408, then in step S410, the process determines if an ACA message is received from another module in the same switch. If an ACA message is received in step S410, then in step S411, zone change occurs, as described below with respect to FIG. 9.

It is noteworthy that the invention is not limited to the foregoing sequence of events, zone change may occur due to the foregoing events in any order.

Figures 5, 6:
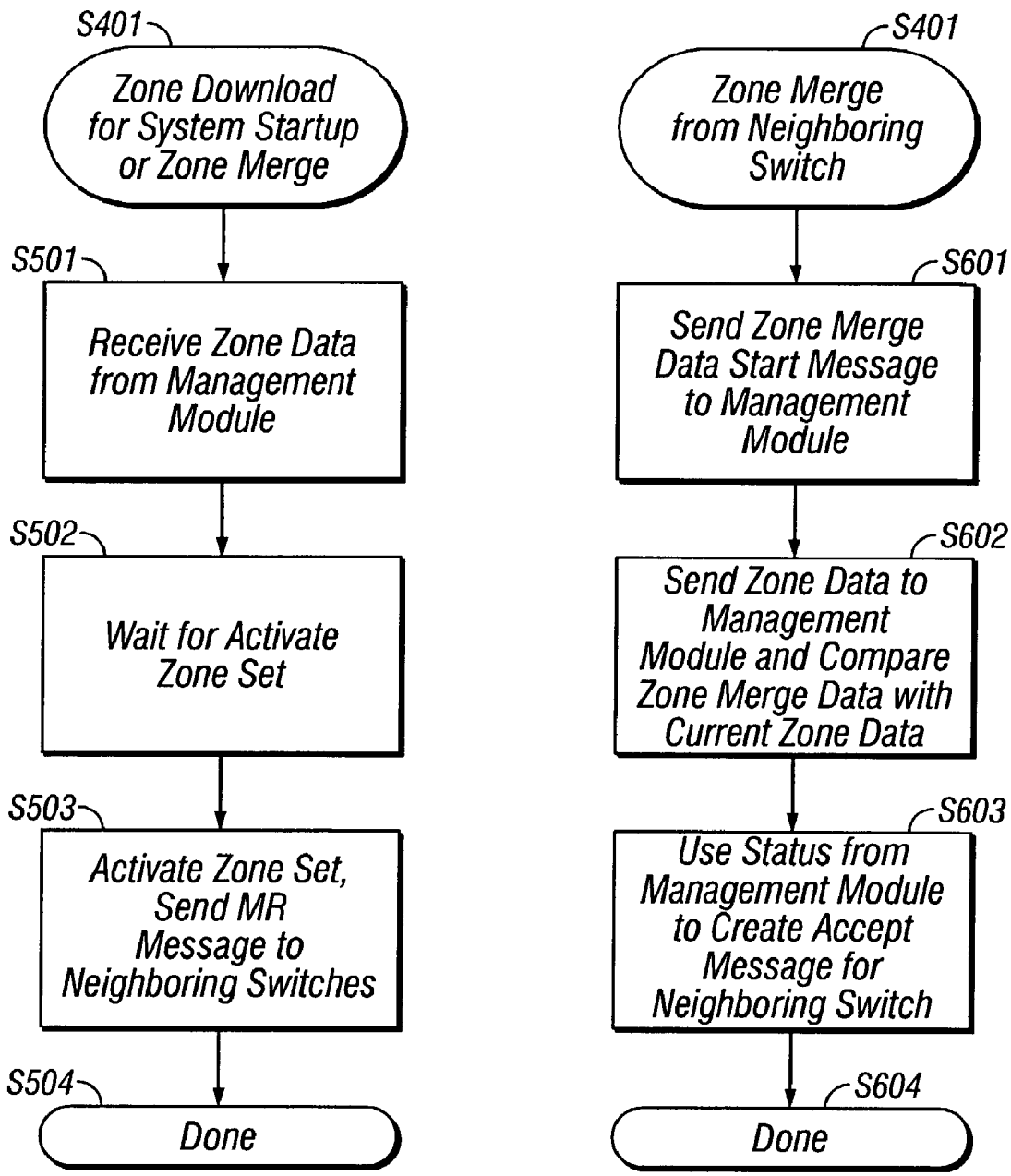
FIG. 5 is a flow diagram of process steps for changing zoning at system start-up, according to one aspect of the present invention.
FIG. 6 is a flow diagram of process steps for implementing a zone merge request, according to one aspect of the present invention.

FIG. 5 shows process steps for handling zoning commands at system start-up from step S401.

Turning in detail to FIG. 5, in step S501, management module 201 sends zoning data to plural switch modules 102A-102F, and switch modules 102A-102F receive zoning data.

In step S502, switch modules 102A-102F wait for an "Activate" zone data set.

In step S503, a switch module, e.g., 102A receives Activate zone data set from management module 201. A MR message is then sent to all neighboring external switches thereafter, the process ends in step S504.

FIG. 6 shows process steps used to handle a Merge Request from a neighboring switch received by a switch module.

In step S601, a switch module receives (receiving switch) a zone MR from another external switch (sending switch). For example, switch module 102A may receive a MR from an external switch.

In step S602, a Zone Merge Data Start command is sent to management module 201 by switch module 102A, which initiates zone merge data transfer. Zone data 202 is sent by switch module 102A to management module 201. The received zone data is compared with current zone data by management module 201.

In step S603, based on the comparison in step S602, management module 201 sends a reply message to switch module 102A. Switch module 102A uses the reply to send a message for the Merge Request to the sending switch. If the reply indicates incompatible zones, the link to the sending switch is isolated.

In step S604, the process ends. If management module 201 determines that zone data has changed, it sends zone data to other switch modules (102B-102F) using the process in FIGS. 4A and 4B.

Figure 7A:
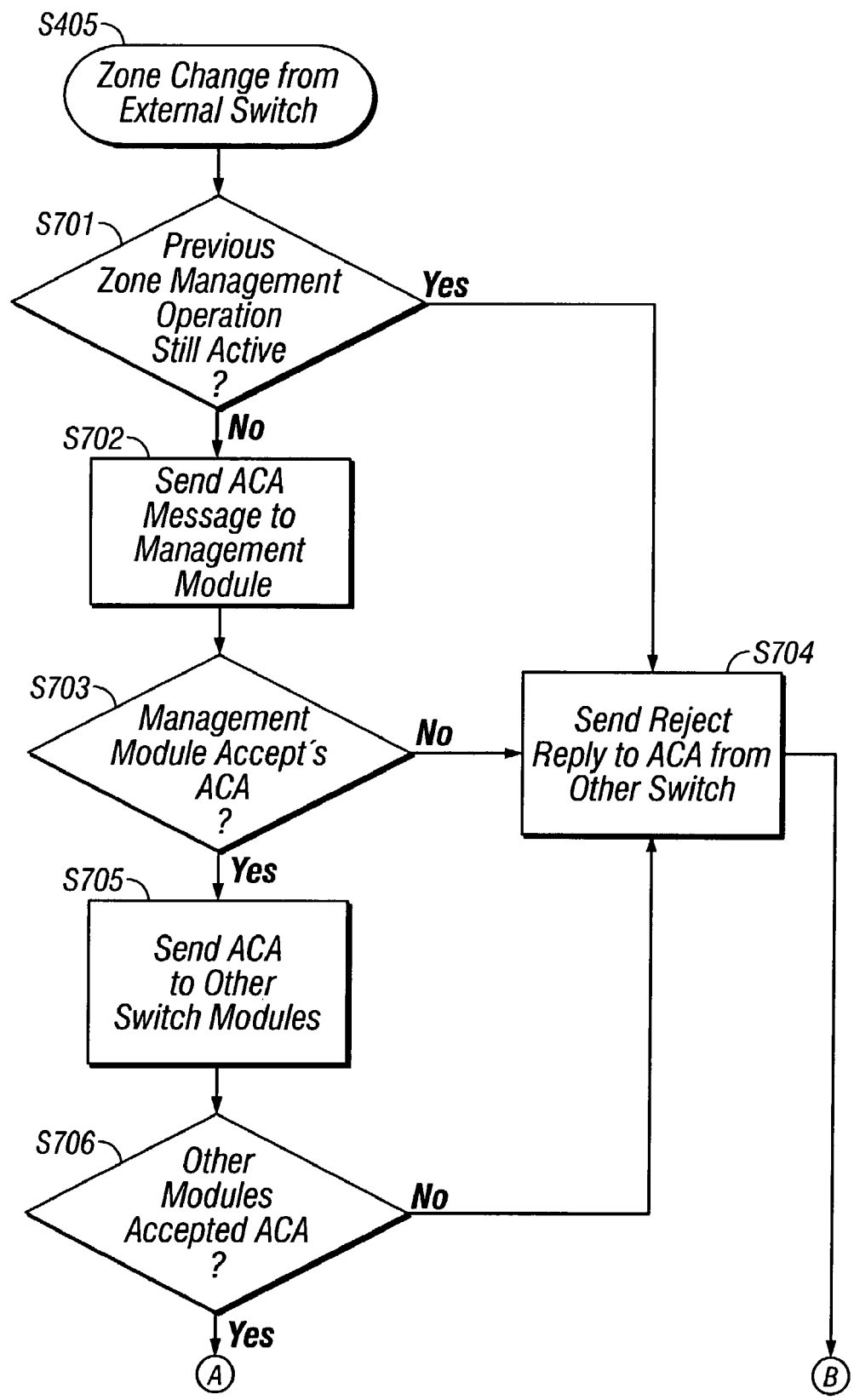
FIGS. 7A and 7B shows a flow diagram of changing zoning based on a request from an external switch, according to one aspect of the present invention.
Figure 7B:
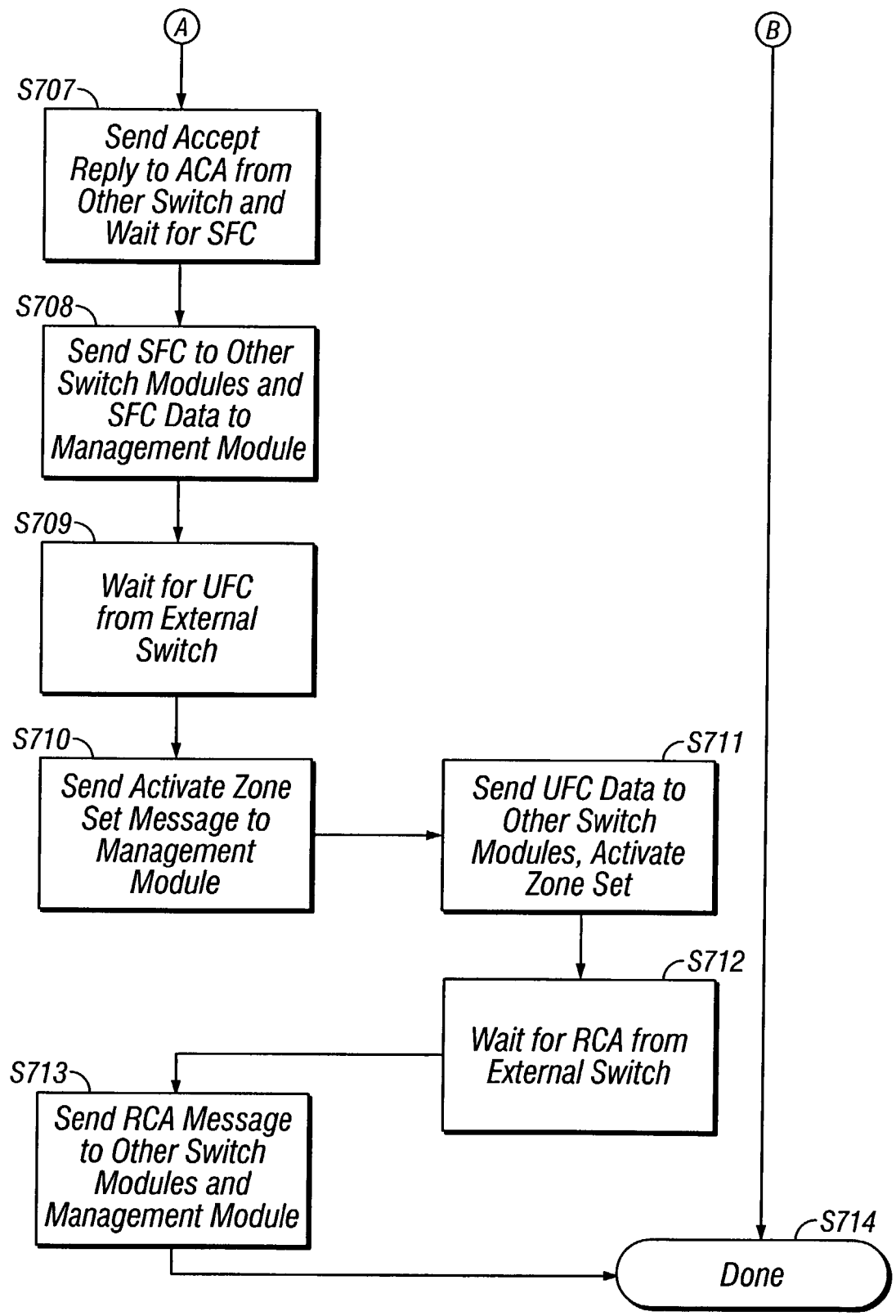

FIGS. 7A and 7B show process steps for zone change based on ACA messages from an external switch (step S405, FIG. 4A).

Turning in detail to FIGS. 7A and 7B, in step S701, a switch module (e.g. 102A) receives an ACA message from an external switch (e.g. 102) and determines if a previous zone management operation is still in process. If the previous zone management operation is still in-process, then in step S704, switch module 102A rejects the current ACA from the external switch.

If a previous zone management operation is not in process in step S701, then in step S702, switch module 102A sends an ACA message to management module 201.

In step S703, management module 201 either accepts or rejects the ACA message. If the ACA message is rejected by management module 201 then the process moves to step S704.

If the ACA message is accepted by management module 201, then in step S705, switch module 102A sends the ACA message to all switch modules (e.g., 102B-102F) in the switch.

In step S706, the process determines if the other switch modules have accepted the ACA message. If the ACA message is not accepted by other switch modules, then the process moves to step S704.

If the switch modules (102B-102F) accept the ACA message, then in step S707, a reply message indicating the acceptance is sent by switch module 102A to the external switch, and switch module 102A waits for SFC data.

In step S708, switch module 102A receives the SFC message containing new zoning data from the external switch. Switch module 102A sends the SFC message to all other local switch modules (102B-102F) and management module 201.

In step S709, switch module 102A waits for UFC data from the external switch.

In step S710, switch module 102A sends Activate zone set message to management module 201.

In S711, switch module 102A sends UFC data to all other switch modules and the zone set is activated.

In step S712, switch module 102A waits for RCA from the external switch.

In step S713, switch modules 102A sends a RCA message to other switch modules (102B-102F) in the switch (e.g. 200) and to management module 201, and in step S714, the process ends.

Figure 8A:
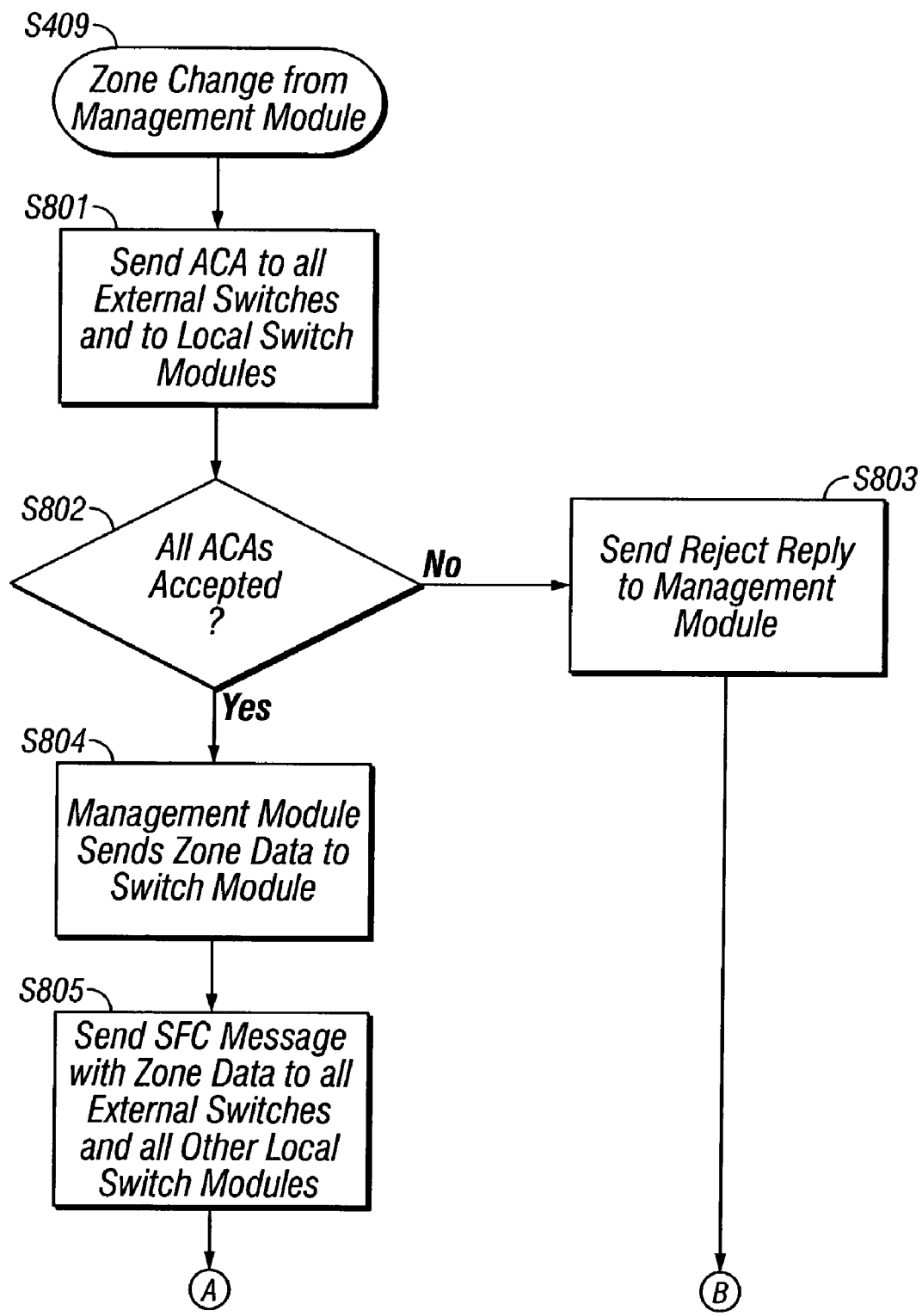
FIGS. 8A and 8B is a flow diagram of changing zoning based on commands from a management module, according to one aspect of the present invention.
Figure 8B:
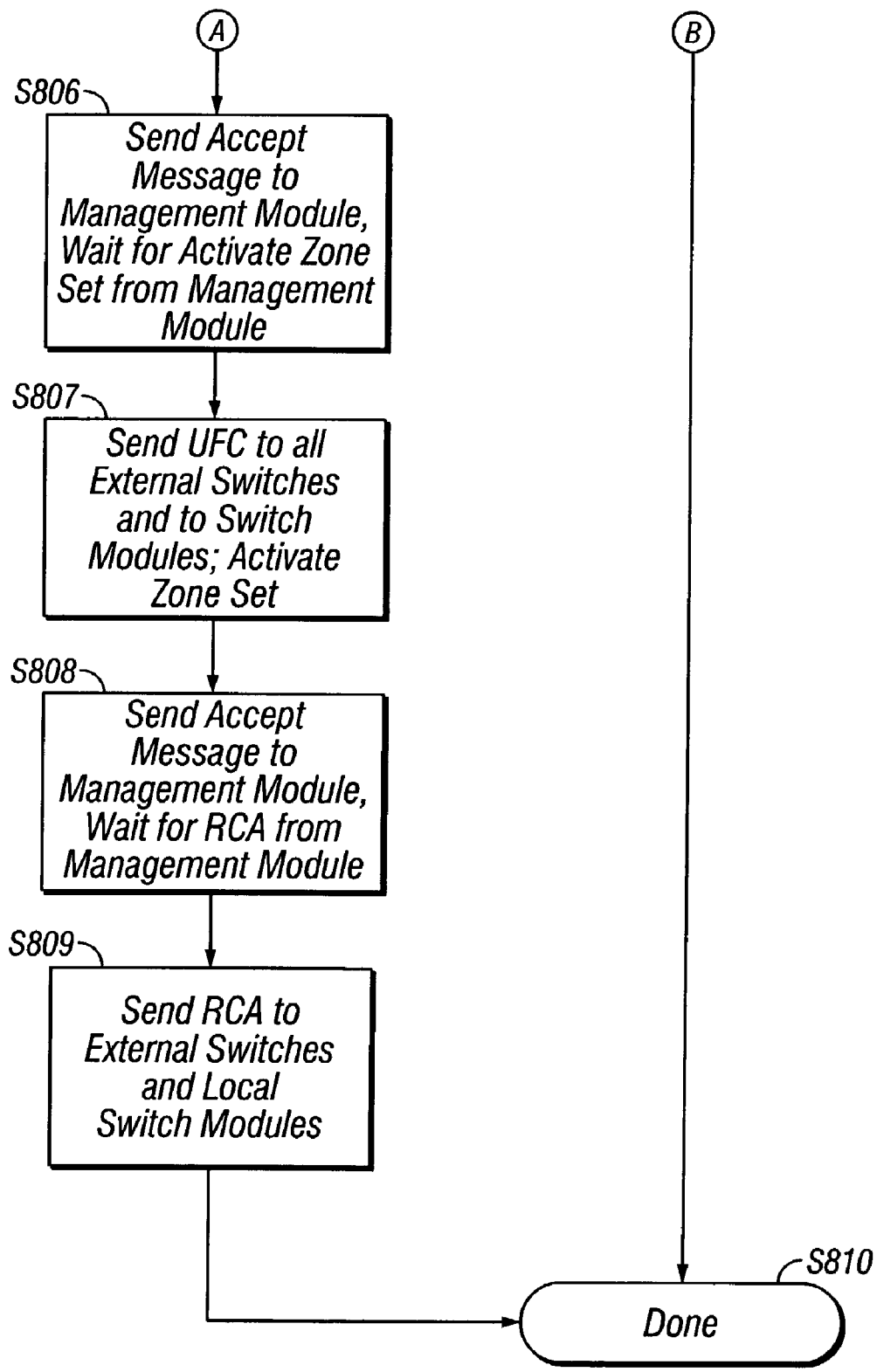

FIGS. 8A and 8B show process steps for zone management triggered by management module 201 (step S409). Management module 201 selects a module (for example, switch module 102A) for implementing zone management.

Turning in detail to FIGS. 8A and 8B, in step S801, management module 201 sends ACA messages to switch module 102A and then switch module 102A sends the ACA message to all external switches in the fabric and to local switch modules (102B-102F).

In step S802, the process determines if all ACAs are accepted. If the ACA messages are not accepted, then in step S803, a reply regarding the rejection is sent to management module 201 by switch module 102A.

If the ACA messages are accepted, then in step S804, management module 201 sends zone data to switch module 102A.

In step S805, switch module 102A sends SFC message with zone data to all external switches and switch modules 102B-102F.

In step S806, after SFC messages are accepted, switch module 102A sends an acceptance message to management module 201. Switch module 102A then waits for Activate Zone Set command from management module 201.

In step S807, after Activate Zone command is received from management module 201, switch module 102A sends UFC command to all other switch modules 102B-102F and to all external switches.

In step S808, switch modules 102A sends an acceptance messages to management module 201 and waits for RCA from management module 201.

In step S809, switch module 102A, after receiving the RCA message from management module 201 sends RCA messages to all other switch modules 102B-102F and to external switches, and in step S810, the zone change process ends.

Figure 9:
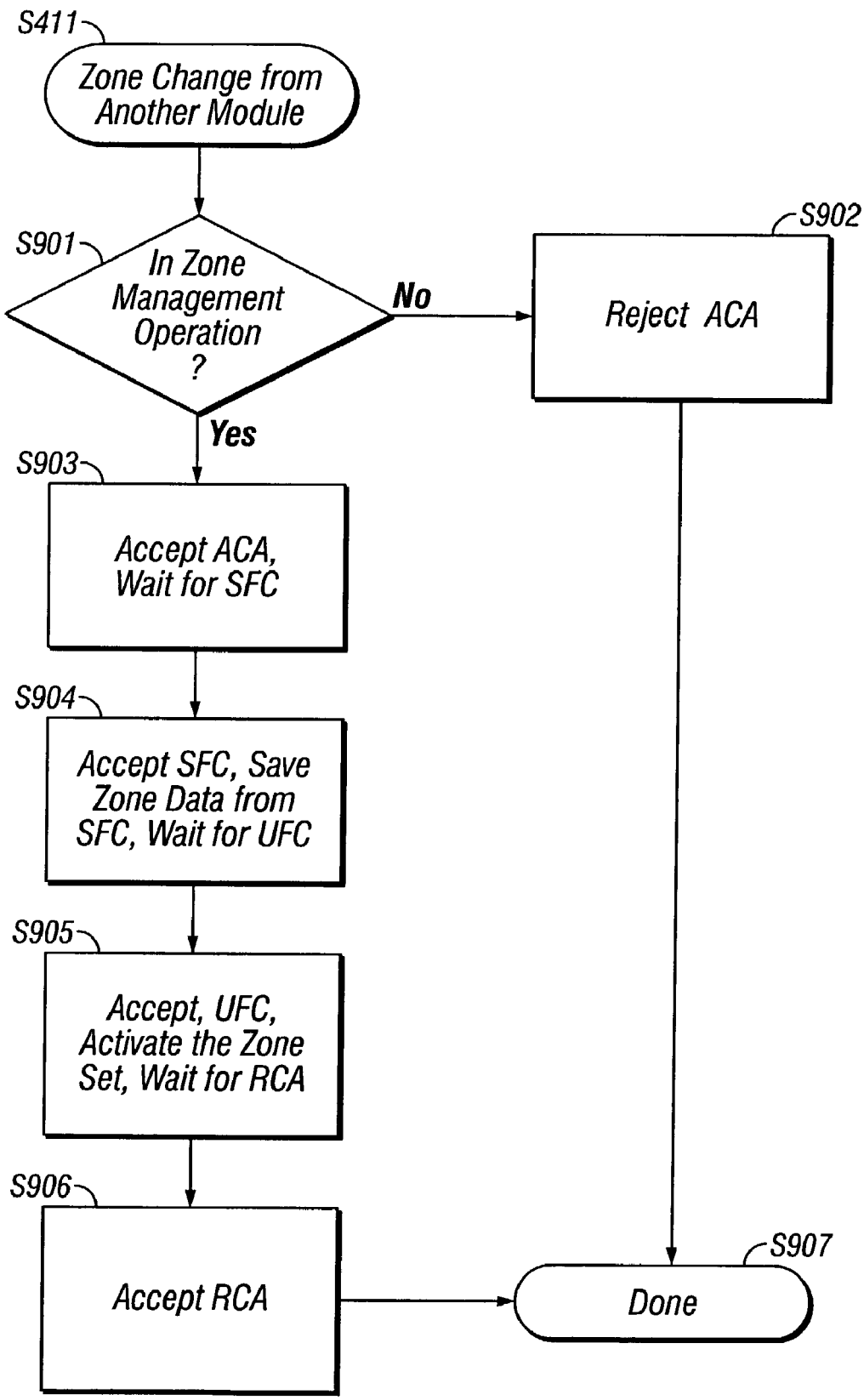
FIG. 9 is a flow diagram of executable process steps for changing zoning in a multi-module switch based on a request from a switch module, according to one aspect of the present invention.

FIG. 9 shows process steps for zone change triggered by a module in a multi-module switch, e.g., 102A. If a switch module (e.g. 102A) is involved in the process steps of FIGS. 7A and 7B and/or FIGS. 8A and 8B, it sends messages to other switch modules (102B-102F). These other switch modules process the messages as discussed below with reference to FIG. 9.

Turning in detail to FIG. 9, in step S901, an ACA message is sent by a switch module, e.g., 102A to another switch module, e.g. 102B. If switch module 102B is already performing a zone management operation then it rejects the ACA in step S902 and the process ends in step S907.

If switch module 102B is not performing a zone management operation, then in step S903, switch module 102B accepts the ACA message from switch module 102A, and waits for the SFC message.

In step S904, switch module 102B accepts SFC data and saves zone data from the SFC data at memory 201 and waits for a UFC message.

In step S905, switch module 102B accepts the UFC message and activates the zone set and then waits for RCA message sent by switch module 102A.

In step S906, the RCA message is sent by switch module 102A and accepted by switch module 102B.

In step S907, the process ends.

It is noteworthy that the foregoing process steps showing operation various switch modules, e.g., switch modules 102A, and/or 102B, are to illustrate the adaptive aspects of the present invention and not to limit the invention to any specific switch module.

In one aspect of the present invention, the management module provides a central point of control to synchronize all the switch modules in the multi-module switch. This prevents different switch modules from trying to make zone separate changes at the same time. This allows multiple switch modules to appear as one switch to external switches while keeping zone management operations consistent.

Although the present invention has been described with reference to specific embodiments, these embodiments are illustrative only and not limiting. Many other applications and embodiments of the present invention will be apparent in light of this disclosure and the following claims.

What is claimed is:

1. A method for handling a fibre channel Zone Merge Request from an external switch to a multi-module switch of a network system with a plurality of switch modules, comprising:

sending received zone data from one of the plurality of switch modules of the multi-module switch that receives the Zone Merge request to a management module; wherein the plurality of switch modules have at least one external port and one internal port; and the external port is used to communicate with devices external to the multi-module switch including the external switch and the internal port is used to communicate with one or more of the plurality of switch modules; and one of the plurality of switch modules operates as a primary blade so that the multi-module switch appears as a single switch to other devices in the network system; and comparing received zone data with current zone data, wherein such comparison is performed by the management module.

2. The method of claim 1, further comprising:

sending a reply to the external switch, wherein such reply is created by the management module and sent by the switch module that received the zone merge request from the external switch.

3. The method of claim 1, wherein one of the plurality of switch modules that receives the zone merge request from the external switch sends a zone merge start data command to the management module.

4. The method of claim 1, wherein the management module sends zone data to the plurality of switch modules if zone data changes after the zone data merge request is received from the external switch.

5. A method for loading zoning data from a management module to a plurality of switch modules of a multi-module switch, after a zone merge request is received from a neighboring switch, the method comprising the steps of:

sending a Zone Merge Data Start message from the management module to the switch modules;

sending new zone data from the management module to the plurality of switch modules; and initiating a zone merge with a neighboring switch after the switch modules have received the zone data from the management module; wherein the zone merge is initiated by one of the plurality of switch modules; and the plurality of switch modules have at least one external port and one internal port; and the external port is used to communicate with devices external to the multi-module switch including the external fibre channel switch and the internal port is used to communicate with one or more of the plurality of switch modules; and one of the plurality of switch modules operates as a primary blade so that the multi-module switch appears as a single switch to other devices in the network system.

6. A method for processing a zone merge request sent by an external fibre channel switch to one of the plurality of switch modules of a multi-module switch, the method comprising the steps of:

sending a Zone Merge Data Start message from the switch module that receives the zone merge request to a management module;

sending new zone data to the management module; and comparing the new zone data with current zone data; wherein the plurality of switch modules have at least one external port and one internal port; and the external port is used to communicate with devices external to the multi-module switch including the neighboring switch and the internal port is used to communicate with one or more of the plurality of switch modules;

and one of the plurality of switch modules operates as a primary blade so that the multi-module switch appears as a single switch to other devices in the network system.

7. The method of claim 6, wherein the management module performs the step of comparing the new zone data with the current zone data.

8. The method of claim 6, further comprising the step of creating acceptance messages for new zoning, wherein the acceptance messages are created by the management module.

9. The method of claim 8, further comprising the step of processing a reply to the zone merge request, wherein the switch module that receives the zone merge request processes the reply.

10. The method of claim 9, further comprising the step of isolating a link to the external fibre channel switch when the reply indicates that the merge request includes incompatible zones.

11. A method for handling zone changes based on commands sent from an external switch and received by a switch module from among a plurality of switch modules in a multi-module switch in a fibre channel fabric, the method comprising the steps of:

the switch module receiving an accept change authorization (ACA) message from the external switch;

the switch module determining whether a zone management operation is already in process; and the switch module forwarding the ACA message to a management module, wherein the plurality of switch modules have at least one external port and one internal port; and the external port is used to communicate with devices external to the multi-module switch and the internal port is used to communicate with one or more of the plurality of switch modules; and one of the plurality of switch modules operates as a primary blade so that the multi-module switch appears as a single switch to other devices in a network system.

12. The method of claim 11, further comprising the step of forwarding the ACA message to at least one other switch module of the multi-module switch.

13. The method of claim 12, further comprising the step of determining whether the at least one other switch module has accepted the ACA message.

14. The method of claim 13, further comprising the step of the switch module sending a reply message to the external switch.

15. The method of claim 14, further comprising the step of the switch module receiving a stage fabric configuration (SFC) message containing new zoning data from the external switch.

16. The method of claim 15, further comprising the step of the switch module forwarding the SFC message to the management module and to the at least one other switch module.

17. The method of claim 16, further comprising the step of the switch module waiting for an update fabric configuration (UFC) request from the external switch.

18. The method of claim 17, further comprising the step of the switch module sending an activate zone set message to the management module.

19. The method of claim 18, further comprising the step of the switch module sending the UFC request to the at least one other switch module.

20. The method of claim 19, further comprising the step of the switch module waiting for an request change authorization (RCA) message from the external switch.

21. The method of claim 20, further comprising the step of the switch module sending the RCA message to the at least one other switch module and to the management module.

* * * * *